(12) United States Patent
Shetty et al.

(10) Patent No.: US 8,806,282 B2
(45) Date of Patent: Aug. 12, 2014

(54) DATA INTEGRITY FIELD (DIF) IMPLEMENTATION WITH ERROR DETECTION AND INTELLIGENT RECOVERY MECHANISM

(75) Inventors: Varun Shetty, Bangalore (IN); Debjit Roy Choudhury, West Bengal (IN); Dipankar Das, Bangalore (IN); Ashank Reddy, Bangalore (IN)

(73) Assignee: LSI Corporation, San Jose, CA (US)

( * ) Notice: Subject to any disclaimer, the term of this patent is extended or adjusted under 35 U.S.C. 154(b) by 329 days.

(21) Appl. No.: 13/398,509

(22) Filed: Feb. 16, 2012

(65) Prior Publication Data
US 2013/0219234 A1 Aug. 22, 2013

(51) Int. Cl.
*G06F 11/273* (2006.01)
(52) U.S. Cl.
USPC .......................................... 714/708; 714/774
(58) Field of Classification Search
CPC ................... H04L 1/20; H04L 1/0009
USPC ........ 714/708, 747, 740, 701, 769, 755, 807, 714/718, 748
See application file for complete search history.

(56) References Cited

U.S. PATENT DOCUMENTS 7,757,086 B2 * 7/2010 Walmsley ................... 713/171
8,281,188 B2 * 10/2012 Miller ............................ 714/44

* cited by examiner

*Primary Examiner* — Fritz Alphonse
(74) *Attorney, Agent, or Firm* — Otterstedt, Ellenbogen & Kammer, LLP

(57) ABSTRACT

An apparatus for providing a data integrity field implementation in a data processing system includes a controller operative to interface between a host device and a destination device in the data processing system for transferring at least one data block therebetween. The data processing system further includes an error detection module associated with the controller. The error detection module is operative to determine a probability of an error occurrence based at least in part on a measured current error rate for the data processing system. The controller is operative to implement an error correction methodology which is selectively adaptable as a function of the probability of an error occurrence.

24 Claims, 7 Drawing Sheets

100

200

| BYTE/BIT | 7 | 6 | 5 | 4 | 3 | 2 | 1 | 0 |
|---|---|---|---|---|---|---|---|---|
| 0 | USER DATA | | | | | | | |
| ... | | | | | | | | |
| ... | | | | | | | | 302 |
| n-1 | | | | | | | | |
| n | (MSB) LOGICAL BLOCK GUARD | | | | | | | |
| n+1 | | | | | | | | 304 |
| n+2 | (MSB) LOGICAL BLOCK APPLICATION TAG | | | | | | | |
| n+3 | | | | | | | | 306 |
| n+4 | (MSB) LOGICAL BLOCK REFERENCE TAG | | | | | | | 308 |
| n+5 | | | | | | | | |
| n+6 | | | | | | | | |
| n+7 | | | | | | | | |

900

1000

DATA INTEGRITY FIELD (DIF) IMPLEMENTATION WITH ERROR DETECTION AND INTELLIGENT RECOVERY MECHANISM

BACKGROUND

Data corruption is a prevalent problem in storage systems. While there are many forms of data corruption, there are also many ways to prevent data corruption, each having their own advantages and disadvantages. For example, enterprise class servers use error checking and correcting caches and memory to protect against single and double bit errors. System buses have similar protective measures such as parity. Communications over a network are typically protected by checksums. Many storage systems utilize RAID (redundant array of inexpensive disk) technology to protect against disk failure. In the case of hardware RAID, the array firmware will often use advanced checksumming techniques and media scrubbing to detect and correct potential errors. The disk drives may also feature sophisticated error corrective measures, and storage protocols such as Fibre Channel (FC) and iSCSI (Internet small computer system interface) often feature a cyclic redundancy check (CRC) which guards against data corruption on the wire.

A common trait in most of the existing protective measures is that they work in their own isolated domains or at best between two adjacent nodes in the input/output (I/O) path. In many applications, however, it is desirable (or required) to ensure true end-to-end data integrity (i.e., between a host device and a corresponding destination device). An extension to the SCSI family of protocols allows extra protective measures, including a checksum, to be included in an I/O request. This appended data is referred to as integrity metadata or protection information. Unfortunately, the SCSI protection envelope only covers the path between the I/O controller and the storage device. To remedy this, Oracle and select industry partners collaborated to design a method of exposing the data integrity features to the operating system. This technology, known as data integrity extensions, allows the operating system to generate protection data that will be verified as the request goes through the entire I/O stack, thereby providing a degree of end-to-end data integrity.

T10 is a technical committee of the International Committee for Information Technology Standards (INCITS) standards body responsible for the SCSI family of protocols. Data corruption has been a known problem in the storage industry and T10 has provided a means to prevent such data corruption by extending the SCSI protocol to allow integrity metadata to be included in an I/O request. The extension to the SCSI block device protocol is called the data integrity field (DIF). In a DIF implementation, a storage device having a standard hardware sector size of 512 bytes is reformatted to 520- or 528-byte sectors; the extra eight or sixteen bytes in each sector, respectively, are used internally by the array firmware for integrity checks. The main difference between DIF and proprietary array firmware is that the format of the extra eight or sixteen bytes of information per sector is well-defined as part of an open standard. This means that every node in the I/O path can participate in generating and verifying the integrity metadata.

Unfortunately, however, the existing T10 DIF mechanism requires significant overhead, particularly for data retransmission. Furthermore, systems implementing a conventional T10 DIF standard suffer performance degradation, including, among other disadvantages, reduced data transfer rates.

SUMMARY

Principles of the invention, in illustrative embodiments thereof, advantageously provide a novel DIF implementation which improves error correction capability and I/O performance, particularly in a RAID environment utilizing a T10 DIF standard.

In accordance with an embodiment of the invention, an apparatus for providing a data integrity field implementation in a data processing system includes a controller operative to interface between a host device and a destination device in the data processing system for transferring at least one data block therebetween. The data processing system further includes an error detection module associated with the controller. The error detection module is operative to determine a probability of an error occurrence based at least in part on a measured current error rate for the data processing system. The controller is operative to implement an error correction methodology which is selectively adaptable as a function of the probability of an error occurrence.

In accordance with another embodiment, a method for providing a data integrity field implementation in a data processing system includes the steps of: providing a controller for interfacing between a host device and a destination device in the data processing system for transferring at least one data block therebetween; determining a probability of an error occurrence based at least in part on a measured current error rate for the data processing system; and the controller implementing an error correction methodology which is selectively adaptable as a function of the probability of an error occurrence.

These and other features, objects and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Embodiments of the invention will be described herein in the context of illustrative RAID systems (hardware RAID, software RAID, or both) operative to implement a T10 DIF standard. It should be understood, however, that the present invention is not limited to these or any other particular methods and/or system arrangements. Rather, the invention is more generally applicable to enhanced DIF implementations on a data processing system operative to provide error detection and intelligent error recovery. While embodiments of the invention may be described herein with specific reference to a T10 DIF protocol, it is to be understood that the invention is not limited to this protocol, and that aspects of the invention may be performed using other protocols, both standard and non-standard (e.g., proprietary protocols), as will become apparent to those skilled in the art. Moreover, it will become apparent to those skilled in the art given the teachings herein that numerous modifications can be made to the embodiments shown that are within the scope of the claimed invention. That is, no limitations with respect to the embodiments described herein are intended or should be inferred.

Figure 1:
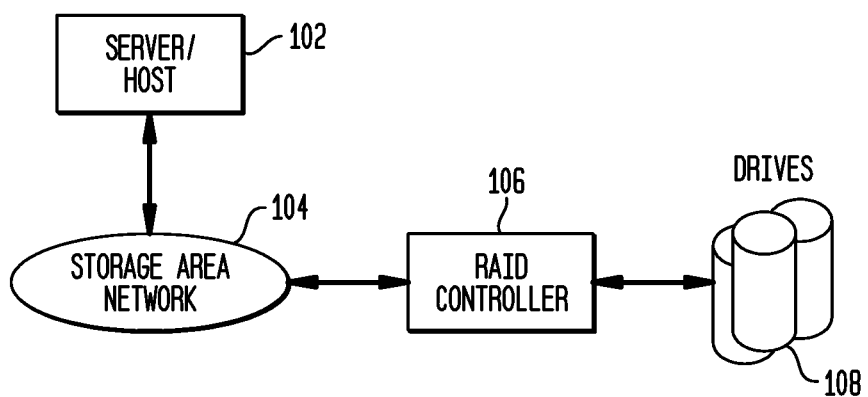
FIG. 1 is a block diagram illustrating at least a portion of a DIF implementation on an exemplary RAID system.

FIG. 1 is a block diagram illustrating at least a portion of a DIF implementation on an exemplary RAID system 100. System 100 includes a server/host 102, or alternative source node, in operative communication, via a storage area network 104, with a RAID controller 106. The RAID controller 106 is coupled with one or more drives 108, or alternative data storage media. In this illustrative implementation, all system components are required to be DIF-enabled at the server, controller and drive level.

Presently, DIF is used widely in hardware RAID implementations, where a specialized hardware controller is implemented on a storage array. However, DIF is not generally used in software RAID implementations due, at least in part, to inherent disadvantages in performance, RAID capabilities and operating system compatibilities, among other shortcomings. Nonetheless, improvements in software RAID capabilities in the above areas have made it increasingly more practical to implement DIF even on software RAID.

Figure 2:
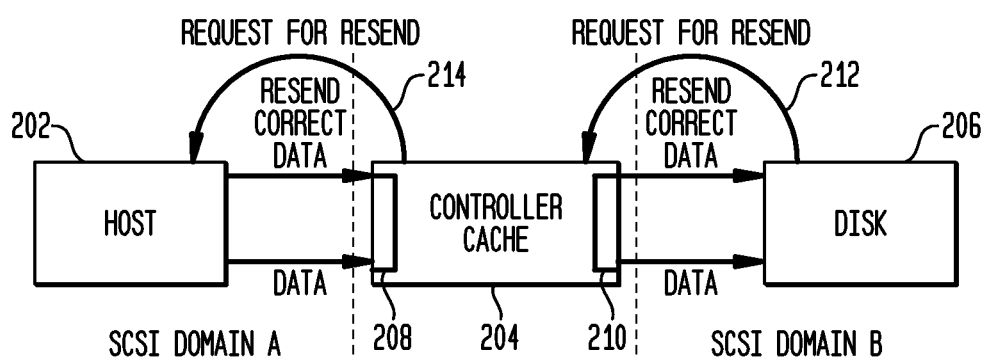
FIG. 2 is a block diagram of an exemplary system which illustrates how an end-to-end DIF feature provides host-to-drive end-to-end data integrity protection via a SCSI direct-access block device protection information model.

FIG. 2 is a block diagram of an exemplary system 200 which illustrates how an end-to-end DIF feature provides host-to-drive end-to-end data integrity protection via a SCSI direct-access block device protection information model. This model provides for protection of user data by appending protection information to each block of user data. This feature may also be referred to as end-to-end data protection (EEDP). System 200 includes a host 202, or alternative source node or device, a controller cache 204, and a disk 206, or alternative destination (i.e., target) node or device. In this illustration, the controller cache 204, which is coupled between the host 202 and disk 206, serves as an intermediate storage device and is operative to interface between the host, which resides in a first SCSI domain ("A"), and the disk, which resides in a second SCSI domain ("B"). The controller cache 204 includes a first input/output (I/O) interface 208 which is adapted to communicate with the host 202, and a second I/O interface 210, which is adapted to communicate with the disk 206.

As data is received by the target disk 206 from the initiator host 202, the source of the data is memory in the host (not explicitly shown). From the standpoint of the controller cache 204, the source is the initiator in SCSI domain A. The source address is specified by SCSI protocol addressing methods for that domain. Address elements may include a protocol-specific SCSI initiator device address, a Logical Unit Number, and a Logical Block Address. The destination of the transfer is a data buffer in the target device. From the standpoint of the controller cache 204, the destination is specified by one or more buffer memory address/length pairs, commonly referred to as a "scatter/gather list." Thus, data sent by the host 202 is buffered by controller cache 204 before being sent to the disk 206. When the data is not properly received by the disk 206, the disk initiates a request 212 to resend the data to the controller cache 204. The controller cache 204, in turn, transmits a request 214 to resend the data to the host 202, whereby the host resends the correct data to the controller cache, which forwards the correct data to the target disk 206.

Figures 3, 4:
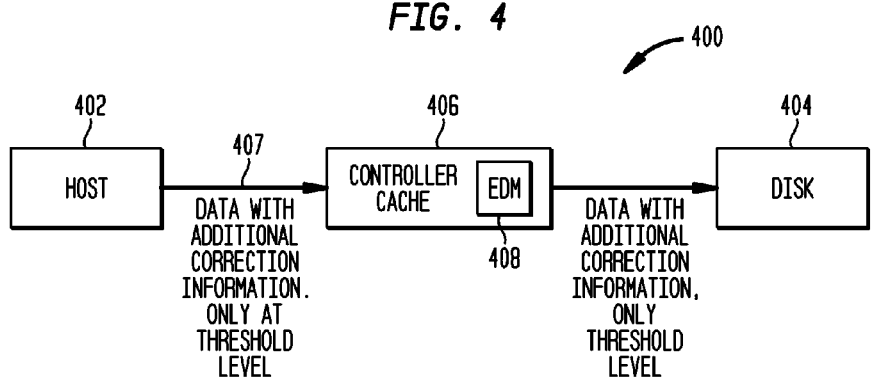
FIG. 3 illustrates an exemplary DIF user data block format.
FIG. 4 is a block diagram depicting at least a portion of an exemplary DIF implementation on a data processing system, according to embodiment of the invention.

The format of a DIF user block is defined by known standards, such as, for example, the above-noted T10 DIF standard. With reference now to FIG. 3, an exemplary DIF user data block format is shown. As apparent from FIG. 3, eight bytes, n through n+7, are appended to the end of each block of user data, where n is an integer and n−1 is the total number of bytes of user data. If the logical block length in bytes returned in a READ CAPACITY parameter data is n, there are n+8 bytes of data transmitted and stored for each data block. The READ CAPACITY parameter provides data capacity information from a target device; using this parameter, one can determine a size of the block of data. For example, if the size of a standard user data block is 512 bytes, then the size of a DIF-protected data block is 520 bytes.

The DIF field, which is appended to a user data portion 302, is divided into three fields as shown; namely, a logical block guard 304 (two bytes), a logical block application tag 306 (two bytes), and a logical block reference tag 308 (four bytes). The logical block guard 304 comprises CRC code, which is used to detect errors during data transferred from the host, to the controller cache, to the destination disk. Upon detection of an error, the correction mechanism is to issue re-read or resend requests to receive the correct data, as previously described in conjunction with FIG. 2. The logical block application tag 306 is used by the application or operating system, and the logical block reference tag 308 is used to ensure the ordering of individual portions of the I/O request.

Conventional DIF implementations have a significant overhead, in terms of having to repeatedly read and resend data upon error detection when the data is transferred, thereby resulting in diminished performance and delay due, at least in part, to the data retransmissions. Specifically, the resending and/or rereading of data adds significant overhead time during I/O transfers and, moreover, may contribute to what is often referred to as "ancient I/O" status. Ancient I/O, as the term is commonly used, occurs when data is detected that has not been processed within a prescribed period of time (i.e., Ancient I/O threshold), typically about five minutes. The ancient IO status might sometimes be a result of I/O held in a wait queue and never processed because of the retransmission overhead associated with conventional DIF mechanisms.

Other disadvantages of conventional DIF implementations include the lack of an intelligent method of correcting errors in data, resulting in lower performance levels in applications in which there is a high error rate. Understandably, efficiency drops as blocks of data must be resent several times, since the present T10 DIF standard does not have the capability to correct the same packet of data that it receives. Thus, when there is a high load on the system, the probability of error is high and errors will likely be observable in the data blocks. The DIF components, upon detecting such errors, will resort to resending data multiple times, which can undesirably reduce efficiency and result in considerable delay, among other issues. In order to reduce overhead, a simple error correction algorithm can be used to correct the data. However, use of such simple error correction often results in generation of errors that were not otherwise present (e.g., in cases where a false error detection occurs), thereby leading to unnecessary data retransmissions and, in turn, even lower performance. Furthermore, there is no intelligent means in conventional DIF implementations of predicting when there would be a higher error rate in data blocks during transfer. For example, there is presently no mechanism to set a threshold for errors or error probabilities, and whether to initiate error correction. Embodiments of the invention advantageously address at least the above-noted needs by providing a novel DIF implementation which includes error detection and an intelligent error recovery mechanism, as will be described in further detail below.

FIG. 4 is a block diagram depicting at least a portion of an exemplary DIF implementation on a data processing system 400, according to embodiment of the invention. System 400, which may represent a storage area network (SAN) or an alternative storage application (e.g., software implementation of a RAID in a server or local computer), includes a server/host 402 in operative communication with one or more disk drives 404, or alternative data storage media, via a controller cache 406. Specifically, the host 402 is connected with the controller cache 406 which, in turn, is connected with disk 404. The controller cache 406 comprises high-speed memory used for various RAID functionalities employed in a normal functioning of the system, such as, for example, read/write functionality. A connection 407 between the host 402 and the controller cache 406 can be wired, as shown, but may, in alternative embodiments, be a wireless connection. Additionally, although shown as being directly connected to one another, the host 402 and controller cache 406 may be operatively coupled via an intermediate system component, as such, for example, a network, another controller, etc. (not explicitly shown). The host 402 is operative as a source device and disk 404 is operative as a destination (target) device in the system 400.

Controller cache 406 includes an error detection module (EDM) 408 that is associated with an intelligent error correction mechanism. This mechanism considerably reduces the load exerted on the system to retransmit data when errors are detected. In an illustrative embodiment, the EDM 408 is operative to determine a time period during data transfer in which a probability of an error occurrence is peaking to one of one or more prescribed error rate limits (ERLs). The intelligent correction mechanism, in accordance with embodiments of the invention, is operative when one of the prescribed ERLs is exceeded. Furthermore, detected errors are corrected by the intelligent correction mechanism which uses different correction modes, the particular correction mode employed being a function of the specific ERL exceeded (where multiple ERLs are used). This intelligent error correction mechanism can be implementation specific, as will be explained in further detail herein below.

As previously stated, system 400 is well-suited for implementation in a SAN environment. However, the system may also be employed in a software implementation of a RAID in a basic server or in a local computer, and also in Internet Protocol SAN (IP-SAN) environments. Moreover, when the RAID implementation can be applied on a block level communications across all interface protocols, system 400 can provide enhanced performance. For example, in a personal computer having the ability to access block level storage and leverage RAID implementation, the intelligent error correction mechanism according to embodiments of the invention can still be used across the available protocol(s).

By way of example only, the EDM 408 is operative in the controller cache 406 running a RAID implementation, which can be a software RAID, a hardware RAID, or a combination of software and hardware RAID. In other embodiments, although perhaps not preferred, the EDM 408 may reside externally to the controller 406, such as, for example, in the host 402. Errors are detected by the EDM 408 using, for example, a T10 DIF protocol or an alternative error detection means, and reported to the controller 406. The EDM 408 calculates a probability of error, $P_e$, based on a measured current error rate. Probability $P_e$ is indicative of the likelihood of an error occurring during the course of I/O operations performed for the current system load. Thus, the EDM 408 calculates an expected number of errors that occur over a defined period of time as a function of current I/O operations and/or system performance, among other criteria. Based at least in part on the EDM's error calculations, the EDM is operative to afford solutions (e.g., intelligent error correction) and the controller 406 is operative to implement these solutions. In other embodiments, one or more functions performed by the EDM functional block 408 can be incorporated into the controller functional block 406, and vice versa.

The probability of error $P_e$ is preferably updated dynamically (e.g., periodically, or when a specified event occurs, such as when the error rate falls within certain prescribed ranges) as the error rate changes. The EDM 408 is also operative to notify the host 402 (e.g., source or enterprise security manager (ESM)) to initiate intelligent correction when $P_e$ reaches or exceeds a prescribed (target) ERL, L; i.e., when $P_e \geq L$. These I/O data blocks (e.g., 512 bytes of data plus 8-byte DIF footer attached) are provisioned for intelligent error correction, so that if the error occurs at any module along the path from the source host 402 to the destination disk 404, it is recovered using the adopted intelligent correction mechanism (e.g., single-bit and double-bit error correction). The term "provisioned" as used herein is intended to broadly refer to the normal DIF used in conjunction with the EDM 408 running background processes (e.g., on the controller 406) to calculate $P_e$. This intelligent error correction occurs only during the time period, as long as $P_e \geq L$.

By way of example only and without loss of generality, assume that x represents the total number of error blocks received in time frame t due to one of the following detected by the T10 DIF algorithm: channel error; unrecoverable read error (URE); and unrecoverable write error (UWE). Once $P_e$ drops below L (i.e., $P_e < L$), the controller cache 406 stops using the intelligent correction mechanism and reverts to a normal data transfer mode (i.e., the usual data transfer mode) wherein error correction is suspended. As previously stated, there can be more than one ERL (as may be defined by a user). Note, that $0 < L < 1$. Each ERL can have a different data transfer mode corresponding thereto. In this manner, more aggressive intelligent error correction mechanisms may be utilized for increasingly higher ERLs.

Assume, for example, an error probability of 90 percent (i.e., $P_e=0.9$). Multiple ERLs, e.g., L1 and L2, can be set corresponding to lower and higher levels, respectively. As these limits are crossed, different modes of intelligent error correction implementations are employed. Additionally, a much higher limit, $L_H$, can be set. This limit $L_H$ might represent, for instance, an unacceptable error probability defined by a user, at which point the user can suspend all operations until a cause of the high error rate can be determined and addressed.

Figure 5:
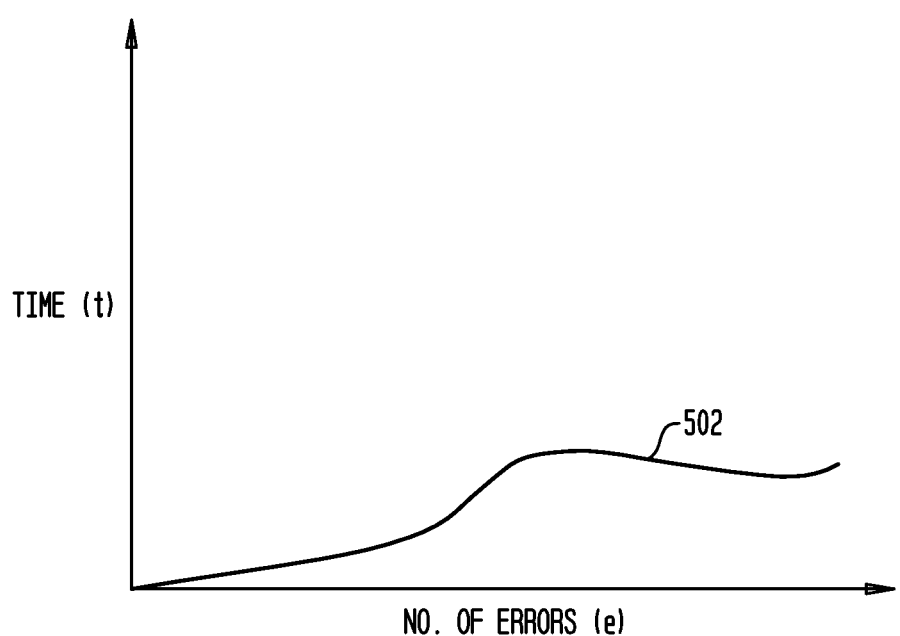
FIG. 5 conceptually depicts a graph of the number of errors (e) versus time (t) for an exemplary data storage system, according to an embodiment of the invention.

FIG. 5 conceptually depicts a graph 502 of the number of errors (e) versus time (t) for an exemplary data storage system, according to an embodiment of the invention. A method for detecting errors in accordance with an embodiment of the invention will now be described herein below, with reference to FIG. 5.

The probability of error $P_e$ is determined using the following equation:

$$P_e = \frac{x}{N}, \quad (1)$$

where, x represents the total number of error blocks received in a given time frame, t2-t1 seconds, and N is indicative of the total number of blocks transferred in the time frame t2-t1. N can be calculated as follows:

$$N = \frac{(R*10^9) \cdot (t2-t1)}{S}, \quad (2)$$

where R is a rate at which data transfer takes place (in gigabits per second) and S is a size of a DIF-protected data block, which, in this example, is 520 bytes (512 bytes in the standard data block plus 8 bytes in the data integrity field). Inserting equation (2) into equation (1) yields the following expression for $P_e$:

$$P_e = \frac{520x}{(R*10^9)t}, \quad (3)$$

where t is the time frame in which $P_e$ is calculated; namely, t2-t1.

Figure 6A:
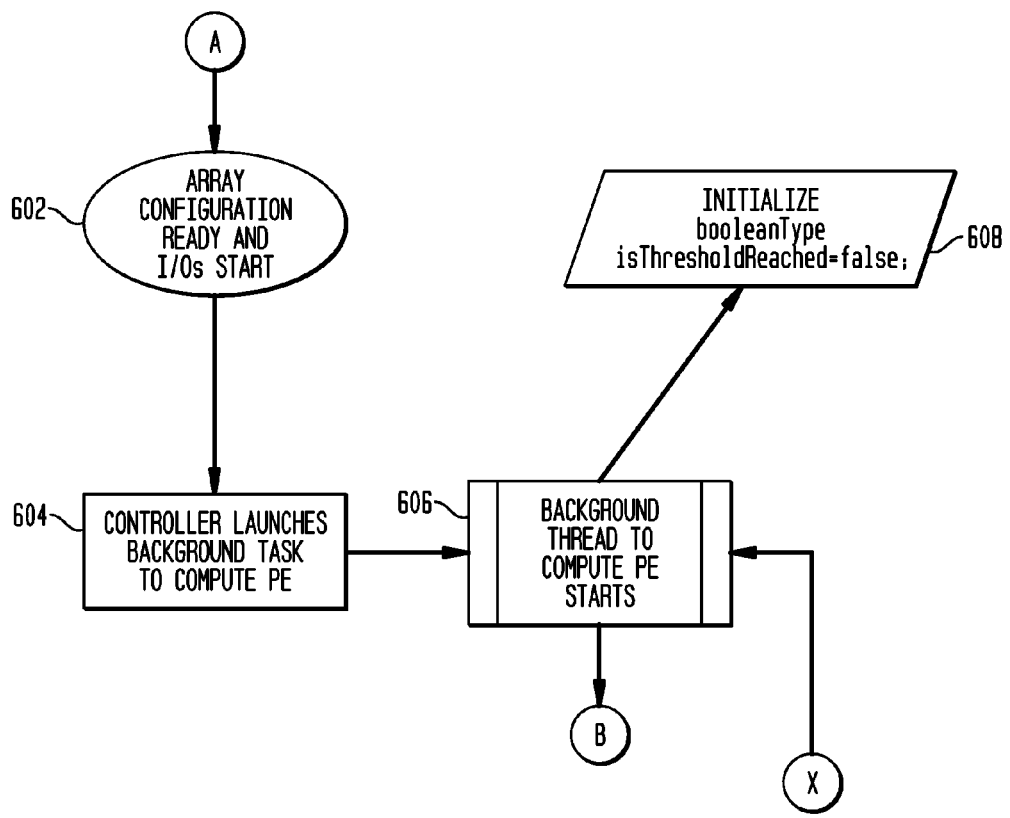
FIGS. 6A and 6B are respective portions of a flow diagram depicting an exemplary method for determining the probability of error $P_e$ and for performing intelligent error correction/recovery in a data storage system, according to an embodiment of the invention.
Figure 6B:
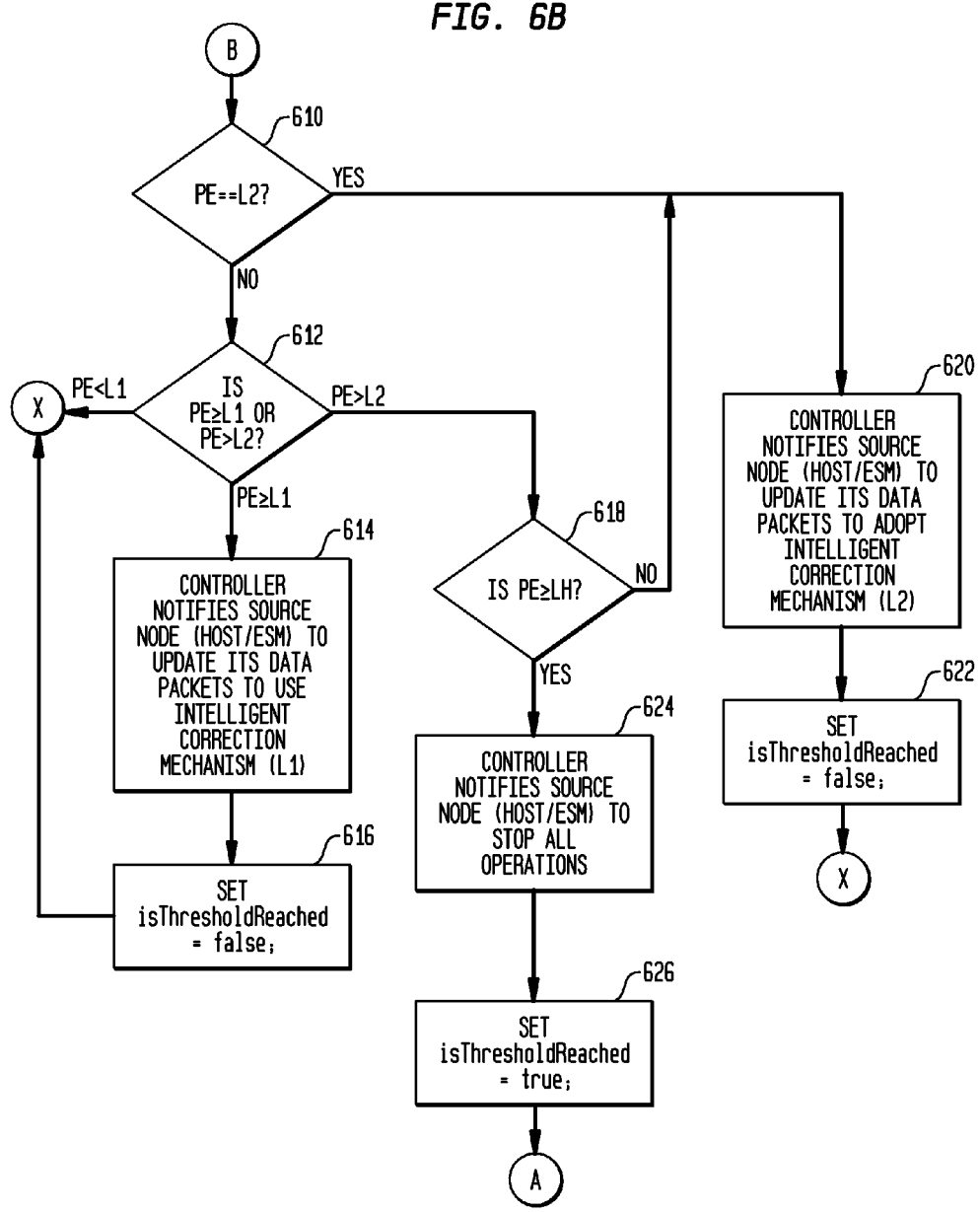

FIGS. 6A and 6B are respective portions of a flow diagram depicting an exemplary method 600 for determining the probability of error (PE) and for performing intelligent error correction/recovery in a data storage system, according to an embodiment of the invention. The exemplary pseudo-code shown below can be used to implement one or more portions of method 600. With reference now to FIG. 6A, method 600 begins in step 602 with array configuration initialization and a start of I/O transfers, or alternative I/O operations (i.e., when I/Os are active). The term "array configuration" as used herein is intended to broadly refer to configuring the storage environment to a user's requirements. This could mean, for example, the literal setup of controllers, servers, and hard disk arrays for operation in the user's application (e.g., physically moving the particular equipment and connecting wires, upgrading software, installing drivers, etc.), configuring the storage environment to cater to I/O operations for prescribed customer requirements, etc.

In step 604, method 600 causes the controller cache (406 in FIG. 4) to spawn (i.e., launch) a background task for computing the probability of error PE. An illustrative background task for computing PE will be described in further detail below in conjunction with FIG. 7. In step 606, a background thread for computing PE starts. The background task begins in step 608 by initializing a first flag (isThresholdReached), indicative of at least a first prescribed threshold being reached, to false (i.e., isThresholdReached=False).

After starting the background thread in step 606, method 600 continues (via continuation point "B") to determine in which threshold range(s) the probability error PE resides. With reference now to FIG. 6B, the method 600 resumes in step 610 (from continuation point "B"), wherein the probability error PE is checked to determine whether PE is equal to prescribed error rate limit L2. If the probability error PE is not equal to the prescribed error rate limit L2 (i.e., step 610 result is "No"), method 600 proceeds to step 612 wherein the probability of error PE is checked relative to error rate limits L1 and L2.

More particularly, when the probability of error PE is less than prescribed error rate limit L1, as determined in step 612, the method 600 proceeds to step 606 (FIG. 6A), via continuation point "X," wherein the background thread to compute a new probability or error PE starts. In this scenario, since the number of errors is below the lowest prescribed error rate L1, there is no need for intelligent correction, and hence the system resumes in a normal mode of operation. When the probability of error PE is greater than or equal to the prescribed error rate limit L1 and less than the prescribed error rate limit L2 (i.e., L1≤PE<L2), as determined in step 612, the method 600 proceeds to step 614, wherein the controller (e.g., 406 in FIG. 4) notifies the host (i.e., source node) to update its data packets to start using a first intelligent correction mechanism (e.g., one-bit intelligent error correction). Once the host has been notified to start using the first intelligent correction mechanism, the method 600, in step 616, sets a flag, which may be a isThresholdReached flag, to "false," indicating that a third prescribed error rate, $L_H$, for the probability of error PE has not been reached. The method 600 then continues to step 606 (FIG. 6A), via continuation point "X," wherein the background task to compute PE starts again.

When the probability of error PE is determined in step 612 to be greater than the error rate limit L2, the method 600 proceeds to step 618, wherein PE is checked to determine if the PE has reached or exceeded the third prescribed error rate limit $L_H$ (i.e., PE≥$L_H$). When the probability of error PE is determined in step 618 to be less than the prescribed error rate limit $L_H$ (i.e., the result of step 618 is "No"), the controller notifies the host to update its data packets to start using a second intelligent correction mechanism (e.g., two-bit intelligent error correction) in step 620. Once the host has been notified to start using the second intelligent correction mechanism, the method 600, in step 622, sets the isThresholdReached flag to "false," indicating that the third prescribed error rate $L_H$ for the probability of error PE has not been reached. The method 600 then continues to step 606 (FIG. 6A), via continuation point "X," wherein the background task to compute PE starts again.

Alternatively, when the value of the probability error PE is determined in step 618 to be greater than the prescribed error rate limit $L_H$ (i.e., PE>$L_H$), the controller notifies the host to update its data packets to suspend all I/O operations in step 624. Upon completion of the controller notification in step 624, the method 600 proceeds to step 626 wherein the isThresholdReached flag is set to "true," indicating that the prescribed error rate $L_H$ for the probability of error PE has been reached. The method 600 then continues to step 602 (FIG. 6A), via continuation point "A," and the entire process starts again.

The above flow diagram illustrates an exemplary work flow of the controller and the background task that is responsible for calculating $P_e$ (i.e., calculating when the possibility of error occurrence is high), and comparing the value of $P_e$ to multiple prescribed error rate limits L1, L2 and $L_H$. The user can set several error rate Limits, such as L1 and L2 and $L_H$ as required. It is to be understood that, although three error rate limits are used in this illustrative embodiment, the invention is not limited to any specific number of error rate limits. Rather, according to other embodiments, more than three error rate limits (e.g., four or more) or less than three error rate limits (e.g., one or two) can be used, which may be defined by the user as desired.

Methodology 600 for determining the probability of error $P_e$ and for performing intelligent error correction, according to an illustrative embodiment of the invention, is shown below in exemplary pseudo-code form as follows:

```
While (I/Os are active)
{
Update time sample period (t);
   If (T10-DIF detected error == true)
   {
      e++;
      Compute P_e = (x * 520) / (R*10^9)*(t);
   }
   If (P_e has transition above/below L1)
   {
      Notify error detection module of the same;  //Refer flow
      diagram for more details.
      If (Pe has transitioned above L1)
      {
      Controller notifies source node (host/ESM) to update their
data packets to adopt intelligent error correction mechanism;
//This can be 1 bit       intelligent correction.
         If (Pe has transitioned above L2)
         {
            Controller notifies the source node (host/ESM) to update
                their data packets to adopt the intelligent error
                correction mechanism;    //This can be 2 bit intelligent
                correction at present.
            If (P_e has transitioned above L_H)
            {
               Controller notifies the source node (host/ESM) to STOP all
                  operations/transfers and provide       logs; and exit from
                  Process;  //The logs collected from host, EDM,
                  controller etc.
            }
         }
      }
      Else If (P_e has transitioned below L1)
         { Controller notifies the source node (host/ESM) to update their
data packets to stop using the              intelligent error correction
mechanism;
         }
   }
}
```

In the above pseudo-code representation, the Controller refers to the operation of the controller 406 in conjunction with the EDM 408 running on the controller.

Figure 7:
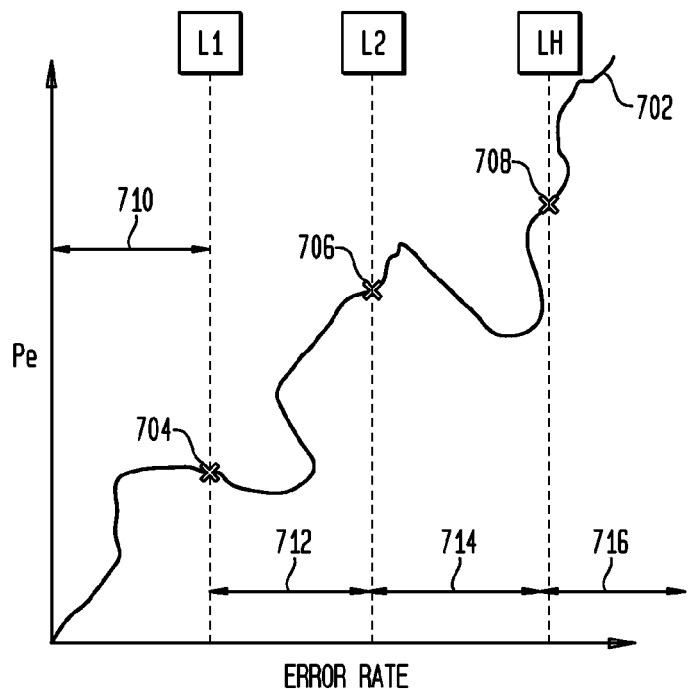
FIG. 7 conceptually depicts an exemplary method for tracking the probability of error $P_e$ and for determining when this probability of error transitions above or below prescribed error rate limits.

The background task (i.e., background process) for computing the probability of error $P_e$, launched in step 604 of the exemplary method 600 shown in FIG. 6A, will now be described in further detail in conjunction with FIG. 7. FIG. 7 conceptually depicts an exemplary method for tracking the probability of error $P_e$ and for determining when $P_e$ transitions above or below prescribed error rate limits L1, L2 and $L_H$. More particularly, the background process is operative to keep track of the probability of error $P_e$ by calculating its value at prescribed intervals (e.g., regular/periodic or user-defined intervals) and is further operative to notify the controller whenever $P_e$ makes a transition above or below a given prescribed error rate limit (e.g., L1, L2 or $L_H$). For instance, consider the exemplary graph 702 depicting probability of error $P_e$ versus error rate.

In this example, there are three prescribed error rate limits; namely, L1, L2 and $L_H$. Here, 704, 706 and 708 are key transition points between two error rate limits which are to be identified and notified to the controller. More particularly, transition point 704 is indicative of a boundary between a first error rate range 710, $P_e$<L1, and a second error rate range 712, L1<$P_e$<L2, transition point 706 is indicative of a boundary between the second error rate range 712 and a third error rate range 714, L2<$P_e$<$L_H$, and transition point 708 is indicative of a boundary between the third error rate range 714 and a fourth error rate range 716, $P_e$>$L_H$.

As previously stated, the type or mode of error correction employed (e.g., the number of bits of error correction, whether or not to suspend I/O operations, etc.) is preferably a function of the calculated probability of error $P_e$. For the embodiment shown in FIGS. 6A and 6B, as the probability of error $P_e$ increases, a more aggressive error correction mechanism is implemented, at least until a certain maximum acceptable threshold, $L_H$, has been exceeded, at which point a determination to suspend all I/O operations is implemented until the source of error has been addressed. By way of example only, FIG. 8 conceptually illustrates the implementation of three different error correction modes/actions and corresponding probability of error values associated therewith.

Figure 8:
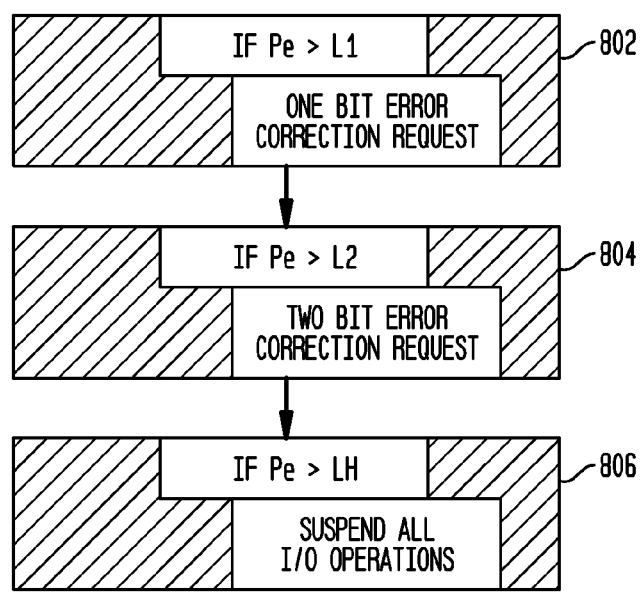
FIG. 8 conceptually illustrates the implementation of three different error correction modes/actions and corresponding probability of error values associated therewith.

With reference to FIG. 8, in a first mode 802, which is triggered when the probability of error $P_e$ exceeds the first prescribed error rate limit L1 (i.e., $P_e$>L1), the controller notifies the source node (e.g., host 402 in FIG. 4) to update its data packets to adopt a one-bit error correction mechanism. In a second mode 804, which is triggered when the probability of error $P_e$ has exceeded second prescribed error rate limit L2 (i.e., L1<$P_e$<L2), the controller notifies the source node to update its data packets to adopt a two-bit error correction mechanism. In a third mode 806, which is triggered when the probability of error $P_e$ has exceeded a prescribed maximum error rate limit $L_H$ (i.e., $P_e$>$L_H$), the controller notifies the source node to suspend all I/O operations. When the probability of error $P_e$ falls below the first prescribed error rate limit L1, the controller preferably notifies the source node to update its packets to stop using the intelligent correction mechanism and to resume normal I/O operations. Thus, in this scenario, L1 is effectively a threshold which triggers implementation of the intelligent correction mechanism. Again, it is to be appreciated that the invention is not limited to any specific number of error rate limits and/or modes of error correction employed by the data storage system.

Figure 9:
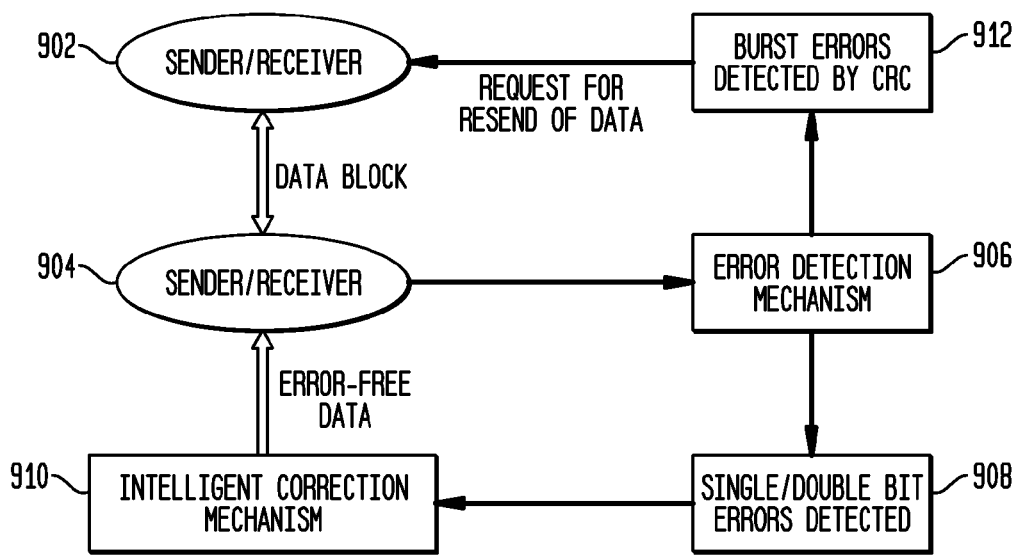
FIG. 9 is a flow diagram depicting an overview of an exemplary error correction/recovery methodology implemented in a data storage system, according to an embodiment of the invention.

FIG. 9 is a flow diagram depicting an overview of an exemplary error correction/recovery methodology implemented in a data storage system 900, according to an embodiment of the invention. System 900 includes a first sender/receiver 902, which may be consistent with host 402 shown in FIG. 4, in operative communication with a second sender/receiver 904, which may be consistent with controller cache 406. Data blocks are transferred between the first and second sender/receiver 902 and 904, respectively. System 900 further comprises an error detection mechanism or module 906 which is coupled with the second sender/receiver 904 and is operative to monitor data received by the second sender/receiver. The error detection mechanism 906, upon detection of single or double bit errors, enters state 908, whereby the intelligent correction mechanism or module 910 is initiated.

The intelligent correction mechanism 910 is operative to correct the data, as previously explained, and the corrected data is then supplied to the second sender/receiver 904 for subsequent processing. Likewise, the error detection mechanism 906, upon detection of burst errors (e.g., by CRC code), enters state 912, whereby the intelligent correction mechanism is suspended and a request to resend the data is transmitted to the first sender/receiver 902 to resent the data block to the second sender/receiver 904.

The error correction/recovery methodology, according to embodiments of the invention, is referred to herein as an intelligent correction mechanism at least in part because the mode of error correction is selectively modified (e.g., on-the-fly) as a function of the actual measured probability of error $P_e$ in the system. Objectives of the intelligent correction mechanism include, but are not limited to, reducing the overhead associated with resending data upon detection of errors, and exploiting the implementation of error correction during a peak time of errors, which is a time interval determined by the EDM in the T10 DIF implementation. In the illustrative embodiments described herein, the intelligent correction mechanism involves the correction of single and/or double bit errors, without adding additional correction bits. This approach is essentially an enhancement to a CRC mechanism to correct single/double bit errors during an actual measured peak time of errors as a function of the error rate. Burst errors can be handled in a conventional manner; e.g., using a data retransmission mechanism, as shown in FIG. 9.

A single bit error correction mechanism suitable for use with the present invention will be described herein below, in accordance with an embodiment of the invention. By way of example only, consider a scenario involving 16 data bits and 16 CRC bits. At the transmitter side, a transmitted data frame, $F_t$, can be represented as follows:

$F_t$=Data transmitted($D_t$)+Checksum transmitted($C_t$)

Similarly, at the receiver end, a transmitted data frame, $F_r$, can be represented as follows:

$F_r$=Data transmitted($D_r$)+Checksum transmitted($C_r$)

Furthermore, let $C_{cal}$ be the CRC calculated at the receiver end. If no errors are present, then the CRC calculated at the receiver end will be equal to the transmitted checksum $C_r$; i.e., $C_{cal}=C_r$. Conversely, if $C_{cal}$ is not equal to $C_r$, then a mismatch is said to have occurred. This mismatch can be caused by an error in the data or checksum. For a single bit error detected in the checksum, only error detection is required; there is no need to correct a mere error in the checksum. A single bit error detected in the data, however, would require correction.

An optimized CRC checksum in an illustrative CRC-16 protocol is computed as follows:

C(15)=E(11)⊕E(10)⊕E(7)⊕E(3)
C(14)=E(10)⊕E(9)⊕E(6)⊕E(2)
C(13)=E(9)⊕E(8)⊕E(5)⊕E(1)
C(12)=E(15)⊕E(8)⊕E(7)⊕E(4)⊕E(0)
C(11)=E(15)⊕E(14)⊕E(11)⊕E(10)⊕E(6)
C(10)=E(14)⊕E(13)⊕E(10)⊕E(9)⊕E(5)
C(9)=E(15)⊕E(13)⊕E(12)⊕E(9)⊕E(8)⊕E(4)
C(8)=E(15)⊕E(14)⊕E(12)⊕E(11)⊕E(8)⊕E(7)⊕E(3)
C(7)=E(15)⊕E(14)⊕E(13)⊕E(11)⊕E(10)⊕E(7)⊕E(6)⊕E(2)
C(6)=E(14)⊕E(13)⊕E(12)⊕E(10)⊕E(9)⊕E(6)⊕E(5)⊕E(1)
C(5)=E(13)⊕E(12)⊕E(11)⊕E(9)⊕E(8)⊕E(5)⊕E(4)⊕E(0)
C(4)=E(15)⊕E(12)⊕E(8)⊕E(4)
C(3)=E(15)⊕E(14)⊕E(11)⊕E(7)⊕E(3)
C(2)=E(14)⊕E(13)⊕E(10)⊕E(6)⊕E(2)
C(1)=E(13)⊕E(12)⊕E(9)⊕E(5)⊕E(1)
C(0)=E(12)⊕E(11)⊕E(8)⊕E(4)⊕E(0), where C(i) is the ith bit of the current CRC result, "⊕" represents an exclusive-OR operation, E(i)=D(i)⊕$C_{prev}$(i), D(i) is the ith bit of input data, and $C_{prev}$(i) is the ith bit of the previous CRC result.

If a single bit of data flips, then the checksum bit in which that data bit has been used will be flipped. For example, data bit 0 is used in checksum bits 0, 5 and 12. If there is an error in data bit 0, then the calculated (transmitted) checksum and received checksum will differ at positions 0, 5 and 12.

Let $C_{xorpattern}=C_{cal}\oplus C_r$. If we consider only one bit of data as being in error, then there will be 16 unique patterns for $C_{xorpattern}$, each corresponding to a unique data bit error. For the generator polynomial for $x^{16}+x^{12}+x^5+1$ in an illustrative X.25 standard (an ITU-T standard protocol suite for packet switched wide area network (WAN) communications), the results of data bit errors and the obtained unique $C_{xorpattern}$ using CRC-16 is tabulated as follows:

| Data Bit in Error | $C_{xorpattern}$ | MSB 8 Bits | LSB 8 Bits |
|---|---|---|---|
| 0 | 0001000000100001 | 16 | 33 |
| 1 | 0010000001000010 | 32 | 66 |
| 2 | 0100000010000100 | 64 | 132 |
| 3 | 1000000100001000 | 129 | 8 |
| 4 | 0001001000110001 | 18 | 49 |
| 5 | 0010010001100010 | 36 | 98 |
| 6 | 0100100011000100 | 72 | 196 |
| 7 | 1001000110001000 | 145 | 136 |
| 8 | 0011001100110001 | 51 | 49 |
| 9 | 0110011001100010 | 102 | 98 |
| 10 | 1100110011000100 | 204 | 196 |
| 11 | 1001100110101001 | 137 | 169 |
| 12 | 0000001101110011 | 3 | 115 |
| 13 | 0000011011100110 | 6 | 230 |
| 14 | 0000110111001100 | 13 | 204 |
| 15 | 0001101110011000 | 27 | 152 |

Depending on the CRC calculated at the receiver end $C_r$, detecting an erroneous bit and inverting the same will result in single bit error correction. A data block of 512 bytes requires a lookup table of 4096 (512×8) entries, each entry corresponding to a unique $C_{xorpattern}$. It is to be appreciated that the invention is not limited to an X.25 standard, or to any specific standard or protocol.

A double bit error correction mechanism suitable for use with the present invention will be described herein below, in accordance with an embodiment of the invention. Again, by way of example only, consider a case which involves 16 data bits and 16 CRC bits. The two bit errors can occur either in the CRC bits, data bits, or both CRC and data bits. As for single bit error correction, for a double bit error detected in the checksum, only error detection is required; there is no need to correct a detected error in the checksum. A double bit error detected in the data, however, would require correction.

In general, the total number of bit error combinations may be determined using the following combination operator:

$$C(n, m) = \frac{m!}{n! \cdot (m-n)!}, \qquad (4)$$

where n is an integer indicative of the number of bit errors and m is an integer indicative of the total number of bits (data+

CRC). Thus, for the above example, the number of possible double bit error combinations can be calculated using the following expression:

$$C(2, 32) = \frac{32!}{2! \times (32-2)!} = 496$$

In each of these 496 double bit error combinations, a unique value $C_{xorpattern} = C_r \oplus C_{cal}$ is obtained.

For the generator polynomial for $x^{16}+x^{12}+x^5+1$ in an X.25 standard using CRC-16, the results of data bit errors and the obtained non-unique $C_{xorpattern}$ is tabulated as follows:

| Column | CRC Pattern | $t_1 \wedge f_1$ | $t_2 \wedge f_2$ |
|---|---|---|---|
| 1 | 0000010000000000 | 11.27 | 16.32 |
| 2 | 0000110111001100 | 27.31 | 15.20 |
| 3 | 0100000000000000 | 20.31 | 15.27 |
| 4 | 0100100011000100 | 23.27 | 11.16 |
| 5 | 0100110011001100 | 9.20 | 4.16 |
| 6 | 0100110101001100 | 13.24 | 8.20 |
| 7 | 0100110101101101 | 12.28 | 17.24 |
| 8 | 0100110111000100 | 4.20 | 9.16 |
| 9 | 0101010101001100 | 17.28 | 12.24 |
| 10 | 0101011101011100 | 16.32 | 21.28 |
| 11 | 0101110111001100 | 8.24 | 13.20 |
| 12 | 0101111011110101 | 28.32 | 16.21 |
| 13 | 1000000000000000 | 16.27 | 11.23 |
| 14 | 1000000100001000 | 15.31 | 20.27 |
| 15 | 1000010001000000 | 7.23 | 12.19 |
| 16 | 1000010101000110 | 19.30 | 14.26 |
| 17 | 1000110000000000 | 12.23 | 7.19 |
| 18 | 1000110001000100 | 3.19 | 8.15 |
| ... | | | |

The actual complete table consists of 496 entries, of which 448 are unique and 48 are not unique. Some of the non-unique table entries are tabulated above. The unique $C_{xorpattern}$ results in the identification of error bits. Inverting the error bits will result in double bit error correction. For non-unique entries, first one set of bits indicated by the $C_{xorpattern}$ are corrected. The, the CRC is recalculated to verify the correction. In case of a mismatch, the next set of bits indicated by the $C_{xorpattern}$ are corrected. For a data block of 512 bytes+2-byte CRC, the total number of entries in a lookup table can be determined using equation (4) above as follows:

$$C(2, 4112) = \frac{4112!}{2! \times 4110!} = 8,452,216,$$

considering non-unique combinations.

The invention, in accordance with embodiments thereof, provides various features and advantages not achievable using conventional DIF implementations. A non-limiting listing of these features and advantages include the following:

Substantially every error detected by T10 DIF will be reported to the controller. With the controller/EDM, a user can keep track of not only how the system fares at different loads and how to monitor the different loads, but errors occurring in the data blocks can be handled (e.g., corrected) in accordance with a prescribed correction mechanism that can be dynamically adapted as a function of the error rate of the system.

A user has a provision for setting one or more threshold limits as a function of prescribed criteria, such as, for example, the type of application in which the system is to be employed, the type of data being transferred by the system, etc. A user operating at high level critical operations may desire to set different threshold limits at which intelligent error correction mechanism is implemented. The intelligent correction mechanism, according to illustrative embodiments of the invention, beneficially includes more than one mode of operation. In this manner, the aggressiveness of the error correction can be optimized to the particular application in which the system is used.

Multiple error rate limits can be set by a user as desired, with each limit corresponding to a different intelligent correction mode of operation. For example if a user encounters a low error probability and primarily one bit errors are detected, the user can initiate a one bit correction methodology; if a greater number of errors are detected, two or higher bit error correction can be initiated, according to embodiments of the invention. Moreover, when the determined error rate exceeds a prescribed unacceptable (i.e., maximum) limit, the EDM module is operative to stop all I/O operations, notify the user of an unacceptable error rate and collect logs (EDM logs and RAID implementing solution logs) to assist in debugging the root cause of the high errors.

The invention can not only be implemented in a SAN environment, but (assuming advancements in technology) embodiments of the invention can be used in all fields of block level communication, providing solutions for future applications in different RAID implementations and different block sizes.

Embodiments of the invention considerably reduce the overhead of "resend/re-read" used in conventional mechanisms. This can be very useful in scenarios of high critical data where delay and performance are extremely vital factors for critical level applications. Even systems running non-critical level applications can achieve a considerable increase in performance using techniques of the invention.

Embodiments of the invention comprise an error prediction mechanism which analyses the error rate and implements an intelligent correction methodology only during peak time, after an error probability has exceeded a prescribed error rate limit. Using this inventive approach in a combined mechanism beneficially improves the efficiency of the DIF implementation over existing approaches. Also a user has the added advantage of setting multiple error rate limits as per his/her requirement.

The intelligent correction mechanism according to embodiments of the invention can be implemented as an extension to existing error correction mechanisms (e.g., using the same CRC mechanism), thereby ensuring that it doesn't affect any of the previous functionalities. Therefore, enhanced techniques of the invention can be provided with essentially no modification to the physical block of data sent.

An issue like ancient TO, which might have otherwise resulted due to overhead of the resend mechanism associated with existing approaches, is no longer an issue according to embodiments of the invention.

As indicated above, embodiments of the invention can employ hardware or hardware and software aspects. Software includes but is not limited to firmware, resident software, microcode, etc. One or more embodiments of the invention or elements thereof may be implemented in the form of an article of manufacture including a machine readable medium that contains one or more programs which when executed implement such method step(s); that is to say, a computer program product including a tangible computer readable recordable storage medium (or multiple such media) with computer usable program code stored thereon in a non-transitory manner for performing the method steps indicated. Furthermore, one or more embodiments of the invention or elements thereof can be implemented in the form of an apparatus including a memory and at least one processor (e.g., vector processor) that is coupled with the memory and operative to perform, or facilitate the performance of, exemplary method steps.

As used herein, "facilitating" an action includes performing the action, making the action easier, helping to carry out the action, or causing the action to be performed. Thus, by way of example only and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a tangible computer-readable recordable storage medium (or multiple such media). Appropriate interconnections via bus, network, and the like can also be included.

Figure 10:
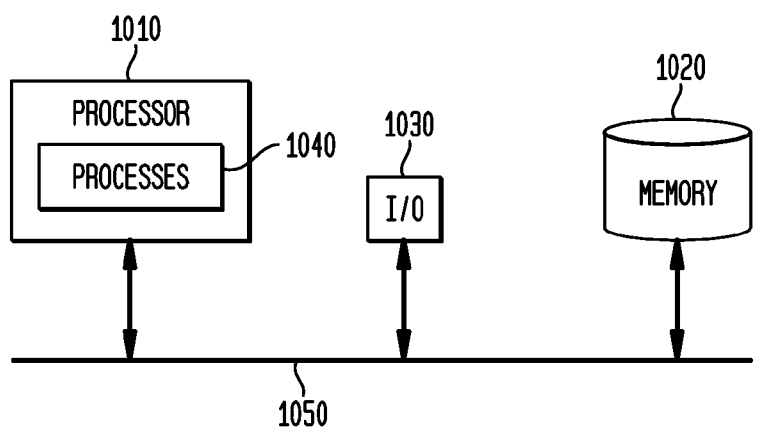
FIG. 10 is a block diagram depicting at least a portion of an exemplary processing system, formed in accordance with an embodiment of the present invention.

Embodiments of the invention may be particularly well-suited for use in an electronic device or alternative system (e.g., communications system). For example, FIG. 10 is a block diagram depicting at least a portion of an exemplary processing system 1000 formed in accordance with an embodiment of the invention. System 1000, which may represent, for example, a RAID system or a portion thereof, may include a processor 1010, memory 1020 coupled with the processor (e.g., via a bus 1050 or alternative connection means), as well as input/output (I/O) circuitry 1030 operative to interface with the processor. The processor 1010 may be configured to perform at least a portion of the functions of the present invention (e.g., by way of one or more processes 1040 which may be stored in memory 1020 and loaded into processor 1010), illustrative embodiments of which are shown in the previous figures and described herein above.

It is to be appreciated that the term "processor" as used herein is intended to include any processing device, such as, for example, one that includes a CPU and/or other processing circuitry (e.g., network processor, microprocessor, digital signal processor, etc.). Additionally, it is to be understood that a processor may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., display, etc.) for presenting the results associated with the processor.

Accordingly, an application program, or software components thereof, including instructions or code for performing the methodologies of the invention, as described herein, may be stored in a non-transitory manner in one or more of the associated storage media (e.g., ROM, fixed or removable storage) and, when ready to be utilized, loaded in whole or in part (e.g., into RAM) and executed by the processor. In any case, it is to be appreciated that at least a portion of the components shown in the previous figures may be implemented in various forms of hardware, software, or combinations thereof (e.g., one or more microprocessors with associated memory, application-specific integrated circuit(s) (ASICs), functional circuitry, one or more operatively programmed general purpose digital computers with associated memory, etc). Given the teachings of the invention provided herein, one of ordinary skill in the art will be able to contemplate other implementations of the components of the invention.

At least a portion of the techniques of the present invention may be implemented in an integrated circuit. In forming integrated circuits, identical die are typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Integrated circuits so manufactured are considered part of this invention.

An integrated circuit in accordance with the present invention can be employed in essentially any application and/or electronic system in which data storage devices may be employed. Suitable systems for implementing techniques of the invention may include, but are not limited to, servers, personal computers, data storage networks, etc. Systems incorporating such integrated circuits are considered part of this invention. Given the teachings of the invention provided herein, one of ordinary skill in the art will be able to contemplate other implementations and applications of the techniques of the invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. An apparatus for providing a data integrity field implementation in a data processing system, the apparatus comprising:
   a controller operative to interface between a host device and a destination device in the data processing system for transferring at least one data block therebetween; and
   an error detection module associated with the controller, the error detection module being operative to determine a probability of an error occurrence based at least in part on a measured current error rate for the data processing system;
   wherein a type of error correction implemented by the controller is selectively adaptable as a function of the probability of an error occurrence.

2. The apparatus of claim 1, wherein the error detection module is further operative to determine a time period during data transfer between the host and destination devices in which the probability of an error occurrence exceeds at least one prescribed error rate limit indicative of a number of errors occurring in the data processing system during the determined time period.

3. The apparatus of claim 1, wherein the error detection module is further operative to dynamically update the probability of an error occurrence as a function of the measured current error rate for the data processing system during prescribed time intervals.

4. The apparatus of claim 1, wherein the error detection module is further operative to notify the host device to initiate error correction when the probability of an error occurrence is at least equal to a prescribed error rate limit.

5. The apparatus of claim 4, wherein the error detection module is further operative to generate a plurality of control signals, each of the control signals being indicative of the probability of an error occurrence being at least equal to a corresponding one of a plurality of prescribed error rate limits.

6. The apparatus of claim 5, wherein the controller is operative to implement one of a plurality of modes of error correction as a function of the plurality of control signals.

7. The apparatus of claim 1, wherein the error detection module is further operative to generate first and second control signals indicative of the probability of an error occurrence being at least equal to first and second error rate limits, respectively, and wherein the controller is operative to implement one of first and second modes of error correction as a function of the first and second control signals, respectively, the second mode corresponding to a higher error rate than the first mode.

8. The apparatus of claim 7, wherein the controller is operative to perform single-bit error correction in the first mode and to perform double-bit error correction in the second mode.

9. The apparatus of claim 1, wherein the controller is operative to suspend error correction when the probability of an error occurrence falls below a prescribed lower error rate limit for the data processing system.

10. The apparatus of claim 1, wherein the controller is operative to suspend data transfer operations between the host and destination devices when the probability of an error occurrence exceeds a prescribed upper error rate limit for the data processing system.

11. The apparatus of claim 1, wherein the data processing system comprises a data storage system.

12. The apparatus of claim 11, wherein the data storage system is a redundant array of inexpensive disk storage system.

13. The apparatus of claim 1, wherein the controller comprises at least a portion of the error detection module.

14. The apparatus of claim 1, wherein the host device comprises at least a portion of the error detection module.

15. An integrated circuit including at least one apparatus for providing a data integrity field implementation in a data processing system, the at least one apparatus comprising:
  a controller operative to interface between a host device and a destination device in the data processing system for transferring at least one data block therebetween; and
  an error detection module associated with the controller, the error detection module being operative to determine a probability of an error occurrence based at least in part on a measured current error rate for the data processing system;
  wherein a type of error correction implemented by the controller is selectively adaptable as a function of the probability of an error occurrence.

16. The integrated circuit of claim 15, wherein the error detection module in the at least one apparatus is further operative to determine a time period during data transfer between the host and destination devices in which the probability of an error occurrence exceeds at least one prescribed error rate limit indicative of a number of errors occurring in the data processing system during the determined time period.

17. The integrated circuit of claim 15, wherein the error detection module in the at least one apparatus is further operative to dynamically update the probability of an error occurrence as a function of the measured current error rate for the data processing system during prescribed time intervals.

18. The integrated circuit of claim 15, wherein the error detection module in the at least one apparatus is further operative to notify the host device to initiate error correction when the probability of an error occurrence is at least equal to a prescribed error rate limit.

19. The integrated circuit of claim 15, wherein the error detection module in the at least one apparatus is further operative to generate first and second control signals indicative of the probability of an error occurrence being at least equal to first and second error rate limits, respectively, and wherein the controller is operative to implement one of first and second modes of error correction as a function of the first and second control signals, respectively, the second mode corresponding to a higher error rate than the first mode.

20. A method for providing a data integrity field implementation in a data processing system, the method comprising the steps of:
  providing a controller for interfacing between a host device and a destination device in the data processing system for transferring at least one data block therebetween;
  determining a probability of an error occurrence based at least in part on a measured current error rate for the data processing system; and
  the controller implementing an error correction methodology which is selectively adaptable as a function of the probability of an error occurrence.

21. The method of claim 20, further comprising determining a time period during data transfer between the host and destination devices in which the probability of an error occurrence exceeds at least one prescribed error rate limit indicative of a number of errors occurring in the data processing system during the determined time period.

22. The method of claim 20, further comprising dynamically updating the probability of an error occurrence as a function of the measured current error rate for the data processing system during prescribed time intervals.

23. The method of claim 20, further comprising notifying the host device to initiate error correction when the probability of an error occurrence is at least equal to a prescribed error rate limit.

24. The method of claim 20, further comprising:
  generating first and second control signals indicative of the probability of an error occurrence being at least equal to first and second error rate limits, respectively; and
  the controller implementing one of first and second modes of error correction as a function of the first and second control signals, respectively, the second mode corresponding to a higher error rate than the first mode.

* * * * *

UNITED STATES PATENT AND TRADEMARK OFFICE
CERTIFICATE OF CORRECTION

PATENT NO. : 8,806,282 B2
APPLICATION NO. : 13/398509
DATED : August 12, 2014
INVENTOR(S) : Shetty et al.

It is certified that error appears in the above-identified patent and that said Letters Patent is hereby corrected as shown below:

On the Title Page
In item (75)
"Varun Shetty, Bangalore (IN); Debjit Roy Choudhury, West Bengal (IN); Dipankar Das, Bangalore (IN); Ashank Reddy, Bangalore (IN)"
should read --Varun Shetty, Bangalore (IN); Debjit Roy Choudhury, West Bengal (IN); Dipankar Das, Bangalore (IN); Ashank Reddy, Bangalore (IN), Chethan Suresh, Bangalore (IN)--.

Signed and Sealed this
Tenth Day of May, 2016

Michelle K. Lee
*Director of the United States Patent and Trademark Office*